United States Patent Office 3,022,327
Patented Feb. 20, 1962

3,022,327
URETHANE MODIFIED VEGETABLE OIL
Donald J. Waythomas, Lancaster, N.Y., assignor, by mesne assignments, to Textron Inc., a corporation of Rhode Island
No Drawing. Filed Oct. 29, 1958, Ser. No. 770,259
11 Claims. (Cl. 260—404.5)

The present invention relates to drying oils and particularly urethane modified drying oils that are exceptionally fast drying and which produce especially hard films.

In an application for patent filed October 29, 1958, under Serial No. 770,372, now Patent 2,970,062, there is described a urethane modified oil which is stable as to viscosity and which is made from diol oil esters. In that oil there are limitations upon permissible oil length and, therefore, upon the amount of urethane-forming reactants permissible in the initial and final systems. As in the systems described in the aforesaid application for patent, the modified oils of the present invention possess limitations upon oil length which is in the range 30% to 80%.

In accordance with the broad principles of the present invention, a drying oil fatty acid or semidrying oil fatty acid is first changed to a diol ester, most conveniently by alcoholysis of a selected ethylenically unsaturated fatty acid triglyceride with a polyhydric alcohol capable of producing a diol ester. To this diol ester there is then added a simple diol and all of the hydroxyl groups of the system reacted at approximately a 1:1 equivalent ratio with a polyisocyanate. It will be understood that the diol esters may be made from the appropriate fatty acid and a polyhydric alcohol.

The polyhydroxy alcohol capable of producing the desired diol oil ester upon alcoholysis of the vegetable oil will therefore be restricted to those polyhydroxy alcohols containing greater than 2 hydroxy groups and thus the initial reaction of the vegetable oil to produce the desired diol oil ester will be alcoholysis of the oil with glycerine, pentaerythritol, trimethylol propane, trimethylolethane and other like polyols.

A reactant of the present invention is a diol oil ester-diol system formed preferably by alcoholysis of the vegetable oil as indicated above, to which is then added a dihydroxy alcohol and for this purpose substantially any monomer, monomeric glycol having a molecular weight of less than 120 and in which the hydroxy groups are separated by not more than four carbon atoms, may be employed. In practice it will probably be preferred to employ 1,3-butylene glycol, propylene glycol and the lower molecular weight glycols in order to obtain the diol oil ester-diol system from which a modified oil with a very fast drying time is produced.

The urethane modified oil of the present invention is then produced by reacting the diol oil ester-diol system so prepared, namely, the alcoholized oil, i.e., diol oil ester, containing the lower molecular weight diol as an additive, with a polyisocyanate. In general, the reaction will be performed in an inert organic solvent at any selected nonvolatile concentration, say 33% to 66%, or the reaction may be caused to proceed in the absence of such solvent.

It is recommended for purposes of control that some inert solvent be present initially and the system then adjusted to any desired nonvolatile content demanded by the market and the use to which the resultant urethane modified oil is to be put.

The vegetable oil preferably employed as raw product may be either a drying oil or a so-called semi-drying oil, and in this class may be mentioned linseed oil as the most important, as well as safflower, perilla, tall oil and, of course, soybean oil as the outstanding semidrying oil, all of which contain ethylenically unsaturated higher fatty acid triglycerides.

The polyisocyanate employed may be selected preferably from any of the available diisocyanates, as for instance, tolylene diisocyanate, 1,6-hexamethylene diisocyanate, 1,4-diisocyanate cyclohexane, paraphenylene diisocyanate, methylene bis(4-phenylisocyanate) or in fact any bifunctional isocyanate heretofore employed in the preparation of urethane systems, all as recited in U.S. 2,733,261.

Since a vegetable oil of the type described above is the most probable initial raw product, the partial ester which it is desired to prepare, insofar as practical, is that ester wherein all but two of the hydroxy groups are esterified with the fatty acid contained in the drying oil. Where glycerine is the esterifying agent it is therefore desired to produce a monoglyceride; where pentaerythritol is employed as the preferred alcoholizing reagent it is desired to produce a resultant diol ester, etc., all classed herein as diol oil esters.

In general there will be employed, based on the weight of the oil, from about 15% in the case of pentaerythritol, to about 20.4% in the case of glycerol, of the alcoholizing reagent.

The amount of lower molecular weight diol added to the alcoholized system, i.e. the diol oil ester based on the weight of the diol ester, will be from about 5% to about 15%. Those urethane modified oils produced with the higher percentage of added diol as reactants are generally more viscous, faster drying and somewhat poorer in adhesion than those produced with a quantity of diol added as reactant at the lower end of the range. In general, when employing the higher molecular weight glycols one would employ them in an amount within the upper limit of the range, and conversely for the lower molecular weight glycols.

The following are specific illustrations of the principles of the invention and are not given as limitative of the invention:

Example 1

The diol ester of this example was prepared by charging 2100 parts by weight linseed oil (Superior), 320.4 parts by weight pentaerythritol and 0.48 part by weight caustic soda into a reaction kettle and heating under normal alcoholysis conditions, that is, under a carbon dioxide blanket, to 480° F. and holding until the diol ester is formed, which required about two hours. The charge was then cooled to about 200° F. and filtered.

To prepare the urethane modified drying oil of the present invention, 261 parts by weight of tolylene diisocyanate was charged into a reaction vessel equipped with reflux, thermometer and stirrer and the vessel provided with an inert cover or blanket, as for instance carbon dioxide gas, and the tolylene diisocyanate heated to about 100° F. When the tolylene diisocyanate reached temperature there was slowly added over a period of about two hours, a mixture of 500 parts by weight of diol ester above prepared, and 50 parts by weight of propylene glycol and the reaction mixture thereafter held at a temperature below 130° F. for approximately 3 hours to permit complete reaction with formation of a urethane modified drying oil which was at 100% nonvolatile content, a heavy, viscous semi-solid. When the product was reduced with toluene to 51.48% nonvolatiles, its viscosity was determined to be G+.

Upon the addition of 0.03% normal cobalt drier (cobalt naphthanate) the final product, when brushed, set immediately and was surface dry in 1¾ hours. It will be noted in this example that the amount of tolylene diisocyanate added is added on a 1:1 equivalent basis, hydroxyl radical to isocyanate radical.

In this example the 500 parts of diol ester reactant require approximately 147 parts of the tolylene diisocyanate and the 50 parts of added diol reactant, propylene glycol, require 114 parts by weight, accounting for the total of 261 parts initially employed. The free-NCO of the final product was 0.86%.

Similar products were prepared employing 1,3-butane diol, 2,3-butanediol, and 1,4-butane diol. These products when taken up in usual solvents and applied by brushing set substantially immediately.

*Example 2*

The reaction of Example 1 was carried out on 100% solid basis. The production of urethane modified oil of the present invention, by reason of better operating control can be performed in inert solvent systems (normally employed in the paint and varnish trade), as for instance the usual aromatic spirits or in hydrocarbon solvents, the so-called mineral spirits. In such instance the diisocyanate is generally dissolved in the solvent employed using about half of the total solvent to be used in the system and this solution heated in 3-necked flask equipped with thermometer, stirrer and reflux, to 100° F. at which time the diol ester and diol are added slowly and at such rate as not unduly to raise the temperature. After about two hours and upon completion of the addition the mixture is held at 100° F. to complete the urethane reaction, at which time the remaining half of the solvent is added to the flask and the flask and contents heated above about 130° F. but below the boiling point of the solvent for about ½ hour. In this instance the final heating was at 250° F.

The end product, at 50.95% nonvolatiles, possessed a viscosity of Z5. The system was substantially free of excess isocyanate and upon test showed the presence of only 0.37% free NCO.

The urethane modified oil solution produced by this example, when brushed, set immediately and was dry in less than ½ hour.

*Example 3*

There was charged into a reaction vessel and heated at esterifying temperature of about 450° F., until reaction was complete, 136 parts by weight pentaerythritol, 92 parts by weight glycerine, 885 parts by weight distilled tall oil fatty acids. The resultant product was a mixed diol ester, and to this ester there was added 10% by weight of 2,4-pentanediol, namely 105 parts by weight. This diol system was added to 620 parts tolylene diisocyanate contained in xylene at 100° F. and was added slowly as indicated in the previous example, and at the end of the urethane reaction a like amount of xylene was added to produce an end product of approximately 50% nonvolatiles. The resulting material was a modified urethane drying oil having properties substantially the same as those indicated above in Examples 1 and 2.

*Example 4*

In this experiment a dihydroxy ester having a hydroxyl value of 179.4 was prepared from soybean oil and pentaerythritol. To this diol ester was added 1,3-butylene glycol and the whole reacted with tolylene diisocyanate. This experiment was also performed in the presence of a nonvolatile solvent. The procedure was substantially the same as that heretofore described in Example 2.

The charge was 245.6 parts tolylene diisocyanate, 500 parts dihydroxy ester as described immediately above, 50 parts 1.3 butylene glycol, 392.8 xylene (½ total solvent employed). As before, the tolylene diisocyanate and half the amount of solvent as indicated, were charged into the reaction vessel and held at 100° F., the diol system added slowly over a period of about 2 hours, the reaction time being maintained for an additional period of time of approximately 3 hours, at which time the remainder of the solvent was added and the temperature raised to about 250° F. and held for approximately ½ hour.

The resultant product at 50.3% nonvolatile content possessed a viscosity of Z7, a Gardner color of 4 and a residual determined isocyanate content of 0.4%. In the presence of the normal 0.03% cobalt naphthanate drier the product set in 13 minutes and required a dry time of 1 hour 55 minutes.

It will be noted that in the invention of the present application the oil length is stated to be 30% to 80% as contrasted with somewhat higher oil length recited in U.S. Patent 2,970,062 mentioned above. This is for the reason that in the invention of the instant application added or additional diol in the form of glycol is present in the system as is additional diisocyanate for reaction therewith.

The amount of glycol to be employed based on the amount of diol oil ester is generally within the range 3 to 18% keeping in mind that amounts of glycol beyond this range reduce the desired quality of adhesion in the final product; the amount of diisocyanate is, of course, controlled by the total hydroxyl value of the system.

What is claimed is:

1. The method of preparing a urethane modified ethylenically unsaturated vegetable oil having drying properties which comprises reacting, by bringing into contact and heating a hydrocarbon diisocyanate and a diol system comprising a diol ester of an ethylenically unsaturated higher fatty acid of a vegetable oil and a lower hydrocarbon polyol having greater than two hydroxyl groups in the molecule, and 3% to 18% based upon the weight of the diol ester of a hydrocarbon diol having a molecular weight of less than 120, the amount of diisocyanate employed being substantially equivalent to the total hydroxyl of the diol system, and the amount of diol ester being sufficient to produce a final oil length of 30% to 80%, the reaction being continued under heating until the resultant urethane modified oil possesses substantially no free isocyanate.

2. The method of preparing a urethane modified ethylenically unsaturated vegetable oil having drying properties which comprises slowly adding a diol system comprising a diol ester of an ethylenically unsaturated higher fatty acid of a vegetable oil and a lower hydrocarbon polyol having greater than two hydroxyl groups to the molecule, and 3% to 18% based upon the weight of the diol ester of a hydrocarbon diol having a molecular weight of less than 120, to a solution of a hydrocarbon diisocyanate in an inert organic solvent and at a temperature of less than about 130° F., continuing the reaction for several hours after such addition and then heating to a temperature above 130° F. but below the boiling point of the solvent until substantially no free isocyanate remains, the amount of diisocyanate employed being substantially equivalent to the total hydroxyl of the diol system and the amount of diol ester employed being sufficient to produce a final oil length of 30% to 80%.

3. Process according to claim 1 wherein the diol system contains as diol ester the alcoholysis product of linseed oil and pentaerythritol.

4. Process according to claim 1 wherein the diol system contains as diol ester the alcoholysis product of soy oil and pentaerythritol.

5. Process according to claim 1 wherein the diol is propylene glycol.

6. Process according to claim 1 wherein the diol is butanediol.

7. A urethane modified vegetable oil having drying properties prepared by bringing into contact a hydrocarbon diisocyanate and a diol system comprising a diol ester of an ethylenically unsaturated higher fatty acid of a vegetable oil and a lower hydrocarbon polyol having greater than two hydroxyl groups in the molecule, and 3% to 18% based upon the weight of the diol ester of a hydrocarbon diol having a molecular weight of less than 120, the amount of diisocyanate employed being substantially equivalent to the total hydroxyl of the diol system, and the amount of diol ester being sufficient to produce a final oil length of 30% to 80%, the reaction being continued under heating until the resultant urethane modified oil possesses substantially no free isocyanate.

8. The product of the process of claim 3.
9. The product of the process of claim 4.
10. The product of the process of claim 5.
11. The product of the process of claim 6.

References Cited in the file of this patent

UNITED STATES PATENTS

| | | |
|---|---|---|
| 2,358,475 | Pratt et al. | Sept. 19, 1944 |
| 2,787,601 | Detrick et al. | Apr. 2, 1957 |
| 2,833,730 | Barthel | May 6, 1958 |
| 2,844,554 | Nichols et al. | July 22, 1958 |

FOREIGN PATENTS

| | | |
|---|---|---|
| 162,598 | Australia | Apr. 27, 1955 |

OTHER REFERENCES

Paint Technology, vol. 15, No. 172 (1950), page 168.
Chemical Engineering, April 1950, pages 165–166.
Industrial and Engineering Chemistry, July 1954, pages 1498–1503.
The Chemical Age, March 31, 1951, pages 481–484.
Angewandte Chemie, vol. 59, No. 9 (1947), pages 257–288 (page 269 relied on).